Sept. 4, 1962   S. KRONENBERG   3,052,797
HIGH INTENSITY DOSIMETER
Filed Sept. 22, 1959
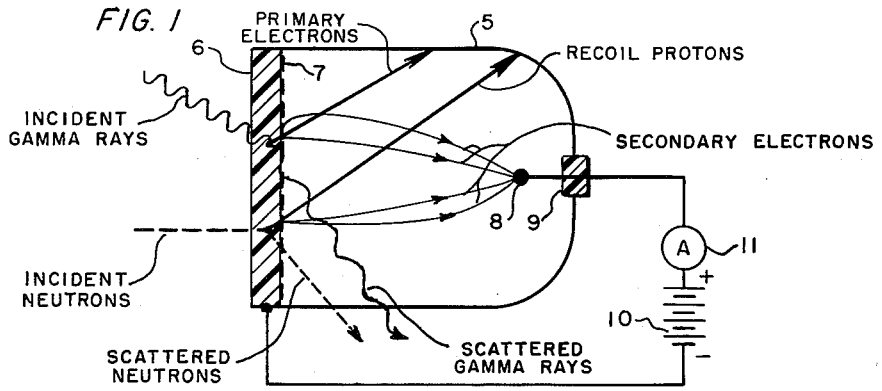
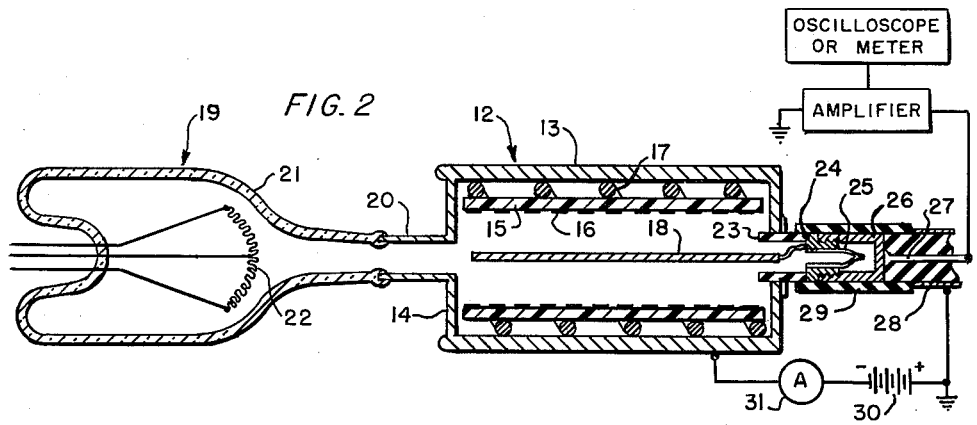
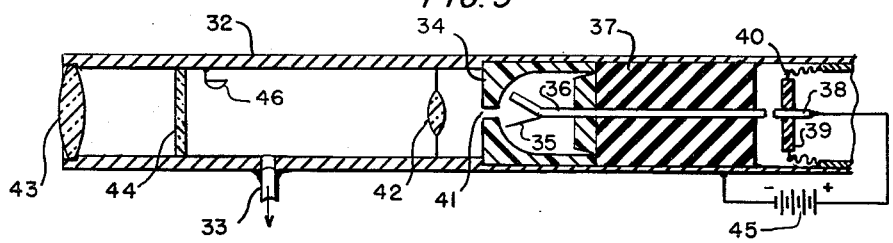
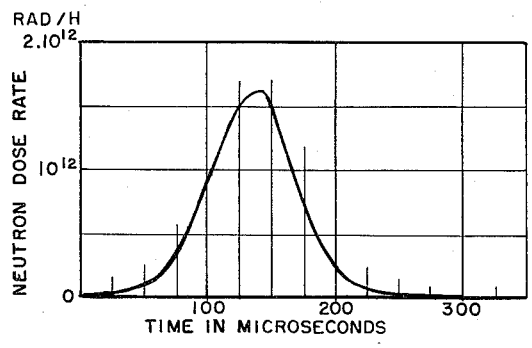
INVENTOR,
STANLEY KRONENBERG.
BY
Harry M. Saragovitz
ATTORNEY.

3,052,797
HIGH INTENSITY DOSIMETER

Stanley Kronenberg, Skillman, N.J., assignor to the United States of America as represented by the Secretary of the Army
Filed Sept. 22, 1959, Ser. No. 841,657
13 Claims. (Cl. 250—83.3)
(Granted under Title 35, U.S. Code (1952), sec. 266)

The invention described herein may be manufactured and used by or for the Government for governmental purposes without the payment of any royalty thereon.

This invention relates to a radiation detecting and measuring device capable of measuring nuclear radiation at ultra-high dose rates with a time resolution of a few milli-microseconds. The device is termed the "Secondary Electron Mixed Radiation Dosimeter" which title, in its abbreviated form, "Semirad," has been widely adopted to designate the invention. Hereinafter the device may be called a secondary electron dosimeter or merely dosimeter for brevity. In any case the use of these terms is intended to refer to the invention in all its aspects unless specific language indicates otherwise. The dosimeter operates by collection of secondary electrons emitted from materials when these materials are irradiated with nuclear radiations including X-rays, gamma rays, neutrons, beta rays, and alpha particles.

The essential elements of the invention consist of an electrically conductive secondary electron emitting material and a separate secondary electron collecting electrode inclosed in a vacuum with an electric potential difference between them so that the potential of the collecting electrode is positive in respect to that of the emitting electrode. When the device is irradiated, secondary electrons are released from the surface of the emitting material and because of the potential difference between the electrodes are collected on the collecting electrode. The resulting electron current is proportional to the applied radiation dose rate, while the total charge transferred is proportional to the total radiation dose delivered to the device; thus measurements of the current, or of its integral, enable this device to be used for dose rate or for total dose measurements.

The secondary electrons emitted from materials have several mechanisms of production. In the case of gamma and X-radiations the secondary electrons are produced when the gamma or X-ray energy is partially converted to the energy of fast electrons in the irradiated material and these electrons, in turn, traverse the surface of the emitting material. Similarly, in the case of fast neutrons, recoil protons are ejected from hydrogenous emitters and upon passing through the wall produce secondary electrons. In case of charged particles, direct production of secondary electrons takes place when these particles traverse the surface of the emitter.

This invention has several advantages for certain applications over other well-known nuclear radiation detecting systems in that it is capable of measuring radiation delivered at dose rates far beyond the capabilities of other systems; and that further, its time resolution can be made on the order of one milli-microsecond. Other advantages are: Simple and direct readout, easily varied absolute sensitivities, and easily varied relative sensitivities for specific radiations by changing the geometry and nature of the emitting and collecting electrodes.

Modifications of this device include variations of the emitter material, for example, the use of hydrogenous materials for fast neutron sensitivity, as well as changes in the emitter surface to vary the yield of the secondary electrons, for example, the use of magnesium oxide to increase the sensitivity of the device.

Since the device of the invention does not depend on the collection of relatively heavy positions and negative gas ions, recombination effects do not occur, and therefore the invention is inherently nonsaturated at high intensity dose rates. This is one of the outstanding features of the invention. Furthermore, because of the rapid collection of secondary electrons (5 milli-microseconds for an applied voltage of 45 volts and an electrode separation of 2 centimeters) the response time of the dosimeter of the invention is approximately one millionth that of conventional ion-chamber dosimeters.

A unique feature of the invention is that its sensitivity can be varied over wide ranges without changing its size as is necessary in conventional ion-chamber detectors. Devices constructed in accordance with the invention are about one thousand times less sensitive than conventional ion-chamber dosimeters with a similar geometry. To reduce the sensitivity in ion-chamber dosimeters and so to make them suitable for higher dose readings, condensers are introduced between the collecting electrodes. The dielectric material in these condensers must be of highest quality and even when using the best materials the condensers are a source of many unwanted effects explainable by persistent internal polarization which make the dose readings unreproducible. In the invention sensitivity can be increased by using a large emitting surface coated with a high yield secondary-electron emitter such as magnesium oxide. To lower the sensitivity of the instrument a small sized emitter and a low yield emitter coating such as aluminum is used.

Although low energy secondary electrons are emitted from both the positive and negative electrodes of the device of the invention, the presence of the electric field will cause the negatively charged electrons emitted from the positive electrode to return immediately to that electrode, and only the secondary electrons emitted from the negative electrode will traverse the interaction space and be collected upon the positive electrode. Therefore, the negative electrode plays the most important part in the secondary electron generation and the sensitivity of the device is proportional to the product of the yield of secondary electrons and the area of the emitting (negative) surface.

The elements of the invention are inclosed in an evacuated envelope and the vacuum serves two purposes. First, it prevents gas ionization and secondly, makes possible the collection of low energy secondary electrons. To achieve these purposes an arbitrary limit for ion production within the envelope established as one ion pair for every 50 secondary electrons in which case ionization in the device of the invention will be no greater than 2 percent of the total response. To realize this goal, the gas within the envelope must be reduced in pressure until the sum of the production of ions by both primary radiation and by ion multiplication is less than 2 percent of the number of secondary electrons produced.

It can be shown that based on the above requirement the following relationship applies:

$$P \leq 4.1 \times 10^{-2}/50d$$

where P is the pressure and $d$ is the diameter of the chamber within the envelope.

To render the device of the invention neutron-sensitive requires that hydrogenous materials be used. When such materials are used there is a tendency for them to outgas. Many materials have been tried and the best materials found at the present time have been annealed polystyrene and high density polyethylene.

Since the devices of the invention are electronic diodes in which the electrons are generated by high-energy radiation, rather than by thermionic emission, the limitations on current that apply to thermionic diodes may be directly applied to the invention. These limitations are the result of space charge formation between the emitter and collector.

A detailed description of some of the embodiments of the invention will be presented hereinafter.

It is a primary object of the invention to provide means for accurately measuring ultra-high intensity nuclear radiations.

A further object of the invention is to provide a device which records accurately very fast changes in dose rate both during its rise in intensity and during its decline.

A further object of the invention is to provide a measuring instrument for nuclear radiation whose sensitivity may be varied in a simple manner throughout a wide range.

A still further object of the invention is to provide a measuring device of the type indicated which is accurate and stable in its indications having a substantially linear response throughout its range.

Other objects and features of the invention will more fully appear from the following description and will be particularly pointed out in the claims.

To provide a better understanding of the invention particular embodiments thereof will be described and illustrated in the accompanying drawings, wherein:

FIG. 1 is a diagrammatic view of a simple form of the device showing its basic operation.

FIG. 2 is a cross-section of an advanced working embodiment of the invention capable of measuring high dose rates of nuclear radiation.

FIG. 3 is a portable dosimeter having a self-contained direct reading indicator.

FIG. 4 is a graph showing the output pulse of a fast atomic reactor and depicting accurate fast neutron dose rate at every instant throughout the energy burst as measured by the device.

FIG. 1 of the drawings illustrates diagrammatically the basic elements of the invention and consists essentially of an envelope 5 capable of maintaining low pressure therein. With the envelope is supported an emissive element 6 having a transparent metallic coating 7 thereon. The element 6 converts incident nuclear radiation into high energy particles such as primary electrons and recoil protons. As a result of this conversion, secondary electrons are emitted into the vacuum in the envelope. These secondary electrons are collected by an electrical potential applied between the coating 7 and a collector 8 projecting into the envelope through an insulator 9. The source of potential may be a battery 10. A measuring instrument 11 is connected in a manner to measure the collected secondary electrons.

In the case where the measuring instrument measures current output of the device the apparatus becomes a dose rate meter and in the case where the instrument measures total charge the device becomes a dosimeter.

When high energy neutrons are incident upon the device of the invention high energy recoil protons are produced giving rise to secondary electrons from the inner surface of the member 6. In the case of incident gamma radiations secondary electrons are produced by scattered high energy electrons. The measuring instrument 11 may be an electrometer, current meter or an oscilloscope. The latter will record the rise and fall of energy during a pulse of incident energy which may be of very short duration. If necessary, the output of the device may be amplified before it is measured.

The captions appearing in FIG. 1 designate the incident energy and the paths of the various particles involved in the function of the device.

As a further control of sensitivity besides varying the hydrogen content of the emitter material the emitter may be coated with various types of material such as aluminum, MgO or fissionable material any one of which may be applied in coatings of various thicknesses to further control the number of secondary electrons emitted for a given dose of energy per unit area.

Another major control effecting the efficiency, dose rate limitation, and sensitivity of the device is the variation in the geometry thereof. An important phase of the geometric control resides in the structure of the emitter system and its relationship to the secondary electron collector. Many variations in the shape and size of the emitter have been made and operated successfully. One or more flat surfaces functioning in combination with a collector electrode have been used. Other emitter conformations have been used such as variously shaped cavities and convex and concave surfaces all of which are feasible and any one of which may be especially suitable for a particular application or requirement.

The principles of the invention and the scope of the appended claims embrace all geometric forms and combinations of materials which the device of the invention may assume. It is believed, however, that detailed descriptions of certain embodiments of the invention which have been constructed and tested will provide a better understanding of both the broad and more specific aspects of the invention.

One desirable embodiment of the invention is illustrated in FIG. 2 of the drawings wherein a hollow cylindrical form of emitter is used in conjunction with a rod type coaxial collector electrode. This type of dosimeter has been tested and found very successful. It will accurately measure high dose rate neutrons, gamma rays and X-rays. It should also be emphasized again that this instrument functions at very high speeds. The complete rise and fall of energy in a burst lasting only two microseconds has been measured and recorded using a linear accelerator as a radiation source.

The secondary electron dosimeter shown in FIG. 2 consists essentially of a vacuum chamber 12 having an envelope 13 of stainless steel or other suitable material. Desirably, the envelope is cylindrical and is provided with end closures 14. A hollow cylindrical emitter 15 is received within the envelope with its outer surface adjacent to the envelope wall. When the device is used as a neutron dose rate meter the emitter material is polyethylene and when it is used for a gamma ray dose rate meter the material is aluminum. The emitter has a vacuum deposited coating 16 thereon of aluminum of such thickness that it is partially transparent to visible light.

The emitter may be secured in position in any desired manner. As shown a resilient member in the form of a helical coil of wire 17 is interposed between the envelope wall and the emitter and acts as a spacer. The spacer 17 also makes electrical contact between the envelope 13 and the coating 16. The coating 16 constitutes one electrode for establishing an electric field to be described hereinafter.

A collector electrode 18 is secured coaxially within and extends substantially throughout the length of the emitter 15. The collector is a rod of nickel or other suitable material and is extended through one of the end closures 14 to provide an external connection to the current meter.

Since it is desirable that a low pressure be maintained in the envelope 13 after its initial pumping a titanium getter 19 is hermetically sealed to a tube 20 communicating with the chamber through the other end closure 14. The getter 19 consists of a glass envelope 21 containing a titanium filament 22 having current supplying leads extending outside its envelope. If the vacuum pressure changes with time sufficiently to disturb the accuracy of the device the filament 22 is heated and acts by absorption to restore optimum operation.

Any suitable means may be employed to connect the collector to an output circuit. A controlling factor which may influence this structure is the specific use for which the dosimeter is designed. The device of the invention will be used to a large extent to measure high intensity energy in which case an output conveying system from the device to a remote point must be provided and must avoid air ionization because even small ionization effects will render the measurements inaccurate. A coaxial cable serves this purpose and is connected in a manner to prevent the effect of air ionization.

A suitable means for coupling the coaxial cable to the device is shown in FIG. 2 wherein a ceramic insulator sleeve 23 is fused into an aperture in the end closure 14. A metallic nipple 24 is fused to the outer end of the insulator 23 and is provided with an axial aperture within which is fused a glass vacuum tip-off member 25. The outer end of the nipple 24 is externally threaded and has threaded engagement with a metallic cap 26 which in turn is electrically connected to the inner member 27 of a coaxial cable 28 the outer member of which is grounded. The cap 26 is chambered to receive the protruding end of the tip-off member 25. The collector 18 is spot-welded to the nipple 24. To prevent ion exchange between the collector and outside air a section of latex tubing 29 is placed tightly around the assembled coupling.

To render the device operative the chamber and the getter 19 are evacuated to about $10^{-5}$ millimeters Hg and the system sealed off at the tip 25. An electric field is then applied between the collector 18 and the emitter 15. Since operation is based upon the collection of secondary electrons the collector must bear a positive potential. Any suitable source of potential may be used such as the battery 30 whose negative terminal is connected to the emitter 15 through its metallic coating 16, the spacer 17 and the envelope 13. The positive terminal of the battery is connected to the shield of the coaxial cable which is grounded. The collector is connected to the input of an amplifier which in turn is connected to an oscilloscope not shown. The battery potential normally used is 45 to 90 volts.

FIG. 4 presents an output curve for a device such as that shown in FIG. 2. In this instance the device was placed within approximately 15 centimeters of a fast reactor of the Godiva II type wherein a controlled nuclear chain reaction creates a short intense burst of neutrons. The curve of FIG. 4 indicates a peak dose rate of $1.5 \times 10^{12}$ rads per hour. The curve also accurately shows values of dose rate during the rise and fall of the burst which took place in a period of 300 microseconds.

In this connection high energy bursts of even shorter duration have been measured with the device of the invention. For example, a dose of 27 megaelectron volt electrons was measured for a total time of 2 microseconds at a resolution of .1 microsecond at a dose rate of $10^{13}$ rads per hour.

A further valuable embodiment of the invention is shown in FIG. 3. This device is a portable lightweight pocket dosimeter adapted to be carried on the person to detect environmental doses. This device is based on the principles of the invention and does not saturate at any practical dose rates. It is therefore capable of giving true dose readings including the case where a person wearing the device is exposed to the flash radiation of an exploding atomic bomb.

The components of this device are inclosed in a tubular metallic casing 32 which is hermetically sealed and provided with a vacuum pump connection 33 which may be tipped off after pumping. A cavity type emitter 34 is fixed in the casing and surrounds an electrometer 35 of the quartz fiber type. The electrometer is provided with a combined support and electrical terminal 36 extending axially through an insulator 37 received within the casing 32. The outer end of the terminal 36 extends toward a coacting contact 38 received in an insulating disc 39 which is sealed to the inner end of a bellows 40, the other end of which is sealed to the wall of the casing 32.

The emitter 34 is provided with an aperture 41 to permit observation of the electrometer 35. An optical system is provided to assist in reading the position of the quartz fiber of the meter 35. Any suitable optical arrangement may be provided. As shown an objective lens 42 is positioned in the casing a short distance from the emitter and an eye-piece lens 43 is secured in the end of the casing. Desirably, a reticule 44 bearing a suitably calibrated scale is situated at the proper focal position between the lenses. A suitable getter 46 is supported in the casing 32.

To prepare the device for use the electrometer must first be charged. This may be done in any suitable manner. A desirable method is to provide a battery and detachable connecting means such as a plug-in type connector for temporarily connecting the battery and meter. The connector should be so made that when its separable parts are engaged its inner contact will engage and move the contact 38 into engagement with the terminal 36. The bellows switch is now closed and the battery circuit completed thus charging the electrometer.

The battery is then entirely disconnected from the dosimeter by disengaging its plug connection. The spring of the bellows will then separate the bellows switch contacts. The device is now ready for use and no battery is required to be carried by the wearer.

When the instrument is now irradiated with nuclear radiation the total dose is measured by the electrometer whose charge is dissipated in proportion to the total dose of the incident radiation.

It should be noted that many ways may be devised for maintaining the required vacuum within the envelope of the device of the invention. One method in addition to those above described should be mentioned. The envelope itself or at least a portion thereof may be made of titanium. Unwanted gas may then be absorbed by heating the envelope from the outside.

What is claimed is:

1. A high intensity dosimeter comprising a chamber evacuated to eliminate substantially all ionizable gas, an emitter in said chamber made of organic material containing hydrogen, a collector electrode in said envelope in juxtaposition to said emitter, a source of potential connected between said emitter and collector and means to measure the current produced by the secondary electrons in said envelope converted by said emitter from the noncharged high intensity nuclear radiation incident from the outside upon said emitter.

2. A high intensity dosimeter according to claim 1 and wherein the material of said emitter is polyethylene.

3. A high intensity dosimeter according to claim 1 and wherein the material of said emitter is high density polyethylene.

4. A dosimeter according to claim 1 and wherein the material of the emitter is polystyrene.

5. A high intensity dosimeter according to claim 1 and wherein said emitter is a hollow cylinder surrounding said collector.

6. A high intensity dosimeter according to claim 1 and wherein said emitter consists of at least two electrically connected oppositely disposed emitter members with said collector positioned therebetween.

7. A high intensity dosimeter comprising an evacuated chamber, an emitter of organic material containing hydrogen in said chamber, a collector electrode in said envelope, a source of electrical potential connected between said emitter and collector, means for measuring the current output derived from the emission of secondary electrons from said emitter, an extension of said vacuum chamber, and a titanium filament in said extension having connections to a source of energy whereby said filament may be heated and used as a getter to eliminate accumulated gas in said chamber.

8. A high intensity dosimeter according to claim 1 and wherein the said vacuum chamber is formed by an envelope of titanium.

9. A dosimeter comprising a chamber having a vacuum therein, an emitter in said chamber capable of converting high intensity uncharged nuclear energy incident thereon from outside said envelope to secondary electrons inside said envelope, an electrometer in said chamber juxtaposed to said emitter, an electrical connection from said electrometer to one terminal of a manual switch, an electrical connection from the other switch terminal to the positive terminal of a direct current power source the other terminal of which is connected to said emitter and optical means for observing and measuring the electrical charge on said electrometer.

10. A dosimeter according to claim 9, and wherein the contacts of said switch are within said vacuum chamber.

11. A high intensity dosimeter comprising a vacuum chamber, an emitter electrode in said chamber composed of organic material containing hydrogen capable of converting high intensity uncharged nuclear energy incident thereon from outside to secondary electrons inside said chamber, an electrically conductive base coating on said emitter, an outer coating at least partially composed of MgO upon said base coating to enhance the sensitivity of the device, a collector element in said vacuum juxtaposed to said emitter, means for creating an electric field between collector and emitter and means for measuring the secondary electron current between said emitter and collector.

12. A high intensity dosimeter according to claim 11 and wherein the said outer coating on said emitter is at least partially composed of fissionable material.

13. A high intensity dosimeter comprising a chamber evacuated to eliminate substantially all ionizable gas, an emitter in said chamber made of organic material containing hydrogen, a collector electrode in said envelope in juxtaposition to said emitter, a source of potential connected between said emitter and collector, means to measure the current produced by the secondary electrons in said envelope converted by said emitter from the non-charged high intensity nuclear radiation incident from the ouside upon said emitter, a titanium filament in said chamber remote from said emitter and collector and means to electrically heat said filament thereby to eliminate accumulated gas from said envelope.

References Cited in the file of this patent

UNITED STATES PATENTS

| | | |
|---|---|---|
| 2,536,991 | Wollan et al. | Jan. 2, 1951 |
| 2,577,106 | Coleman | Dec. 4, 1951 |
| 2,596,080 | Raper et al. | May 6, 1952 |
| 2,754,428 | Franks | July 10, 1956 |
| 2,818,520 | Engstrom | Dec. 31, 1957 |
| 2,898,499 | Sternglass et al. | Aug. 4, 1959 |
| 2,965,781 | Gunst et al. | Dec. 20, 1960 |
| 2,994,773 | Sternglass | Aug. 1, 1961 |

OTHER REFERENCES

Radiation Dosimetry by Hine et al., Academic Press, Inc., New York, 1956, page 210.